June 10, 1947.  E. J. NOBLE  2,422,120

ARTIFICIAL HORIZON

Filed July 13, 1944  2 Sheets-Sheet 1

INVENTOR.
EDSON J. NOBLE
BY
Kwis Hudson Boughton & Williams
ATTORNEYS

June 10, 1947.  E. J. NOBLE  2,422,120
ARTIFICIAL HORIZON
Filed July 13, 1944  2 Sheets-Sheet 2

INVENTOR.
EDSON J. NOBLE
BY
Kwis Hudson Boughton & Williams
ATTORNEYS

Patented June 10, 1947

2,422,120

UNITED STATES PATENT OFFICE 2,422,120

ARTIFICIAL HORIZON

Edson J. Noble, Shaker Heights, Ohio; Marion M. Noble executrix of said Edson J. Noble, deceased Application July 13, 1944, Serial No. 544,710

8 Claims. (Cl. 74—5)

This invention relates to improvements in artificial horizons, that is to say instruments for maintaining a horizontal reference plane or a vertical reference line in spite of any disturbing forces which may be encountered, as for example in an airplane or on shipboard.

One of the objects of the invention is to provide an instrument for the purpose stated which shall be accurate and stable under all conditions.

Another object is the provision of a gyroscopic instrument for the purpose stated which shall be relatively simple in design and of correspondingly low cost.

Still another object is the provision of a gyroscopic instrument utilizing the principle of a blunt peg top for returning the axis of the gyro to vertical position whenever an external force moves it or tends to move it out of that position.

Figure 1:
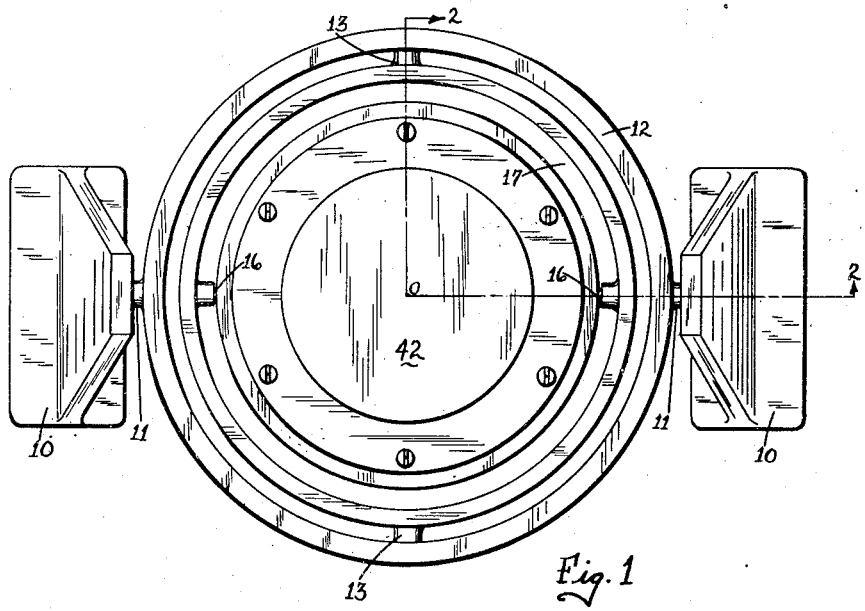

Other objects and features of novelty will appear as I proceed with the description of that embodiment of the invention which, for the purpose of the present application, I have illustrated in the accompanying drawings, wherein Fig. 1 is a top plan view of the complete assembly.

Figure 2:
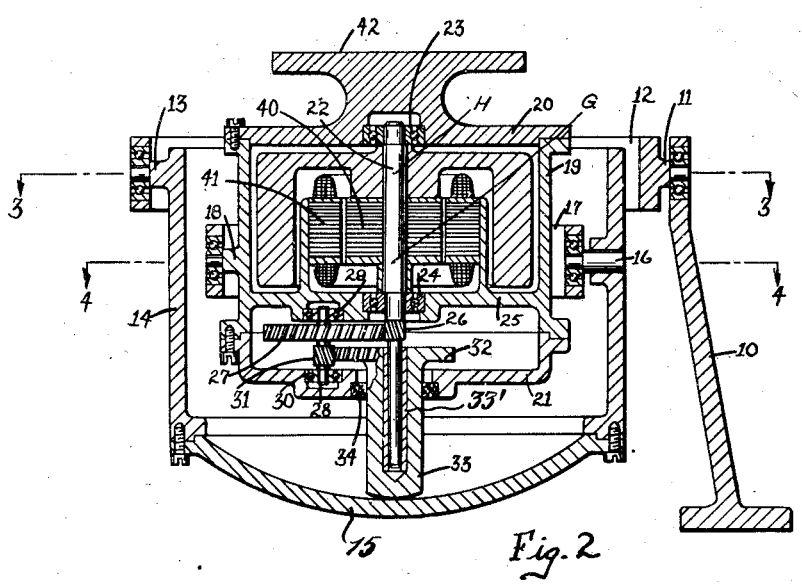

Fig. 2 is a vertical sectional view taken substantially along the line 2—0—2 of Fig. 1.

Figure 3:
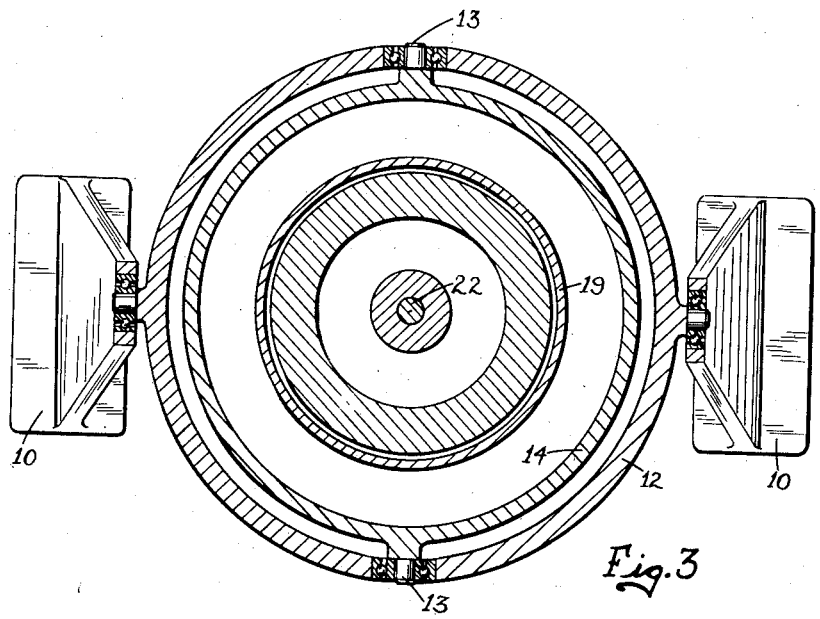
Figure 4:
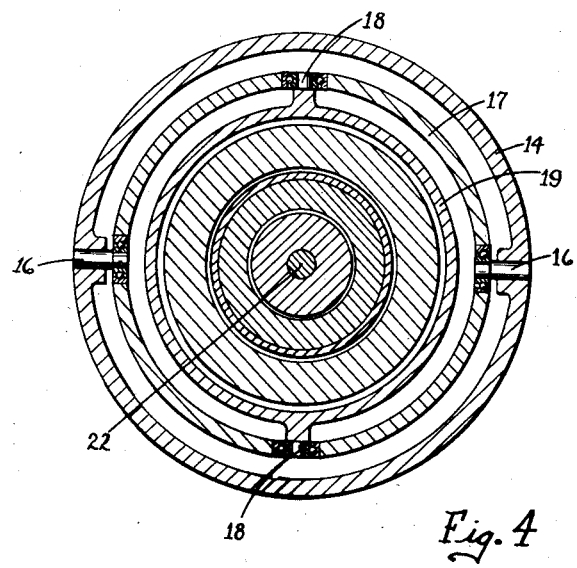

Figs. 3 and 4 are horizontal sectional views taken substantially along the lines 3—3 and 4—4 respectively of Fig. 2.

In the drawings there are shown a pair of standards 10 supporting between them the trunnions 11 of a gimbal ring 12. At right angles to the trunnions 11 there are supported within this ring 12 a pair of trunnions 13 carried by a housing 14 which may be cylindrical, as shown. The housing 14 is therefore universally suspended about the intersection of the lines through 11—11 and 13—13 respectively, in other words about a center H. The center of gravity of the housing and the parts supported thereby is of course well below the point H, so that the entire mechanism acts as a pendulum of short length and short period.

The lower wall of housing 14 is a member 15, the upper surface of which is of spherical contour, hereinafter called semispherical, which is to be understood as meaning a portion of a sphere. The center of curvature of this surface lies in the axis of the instrument, at the point H.

Housing 14 carries a pair of opposed trunnions 16 upon which is journaled a gimbal ring 17, the latter receiving at two points at right angles to trunnions 16 a pair of trunnions 18 which are rigid with the cylindrical body 19 of a gyro casing which has also top and bottom members 20 and 21. The casing 19, 20, 21 is therefore universally supported at the intersection G of the lines through trunnions 16—16 and 18—18 respectively. This casing and the parts carried thereby constitute a gyro, the spin axis of which extends through the center G, and the center of gravity of which lies in that axis, preferably somewhat above the point G.

The shaft 22 of the gyro is mounted in bearings 23 and 24 carried in the top member 20 of the gyro casing and in an intermediate partition 25 thereof. Somewhat below bearing 24 the shaft has a spiral pinion 26 cut therein, which meshes with a spiral gear 27 mounted upon a shaft 28 journaled in bearings 29 and 30 carried in partition 25 and the bottom member 21 respectively. Shaft 28 also carries a spiral pinion 31 which meshes with a spiral gear 32 formed as an integral part of a sleeve 33 that surrounds the constricted lower extremity of shaft 22, a bushing 33' being preferably interposed to reduce friction. Sleeve 33 is slidable as well as rotatable upon bushing 33'. It extends through a central opening in the bottom member 21 of the casing, the annular space between the sleeve and the casing being filled preferably by a felt ring 34 in order to retain lubricant in the gear compartment. While there is but one set of gears 27, 31 illustrated in Fig. 2 of the drawing, it is to be understood that a duplicate set may be employed and disposed diametrically opposite the set illustrated. The lower extremity of sleeve 33 is rounded as shown, upon a shorter radius than that of the semispherical surface of the base member 15 so that a point contact is established between the sleeve and the housing. The gyro should exert a substantial downward thrust against the semi-spherical member 15 through this point of contact. By choosing the proper direction of rotation, the spiral gearing illustrated may be caused to exert such a thrust, but this may be augmented if desired by inserting a compression spring, not shown, between the lower end of shaft 22 and the blind end of the bore in sleeve 33. In fact spur gearing may be used and such a spring relied upon exclusively for exerting the desired thrust.

The shaft 22 rotates at the high speed usual in instruments of this kind. It may be driven electrically as illustrated herein, the motor rotor 40 being attached to the shaft and the stator 41 being carried by the gyro casing. Provisions for conducting electric current to the stator are not illustrated herein, as it will be understood by those skilled in the art that the necessary conductors may be introduced through the trunnions of the gimbal mountings, and as these details per se form no part of the present invention. It will be apparent also that the construction could be readily modified to utilize other driving means such, for example, as compressed air.

At the top of the casing cover member 20 I may form a polished plane surface 42 at right angles to the axis of shaft 22, to function as a reference plane.

The gyro rotates at high speed, while the sleeve 33, because of the reduction gearing, rotates at greatly reduced speed. The purpose of this reduction in speed is to keep the rubbing velocity of sleeve 33 with respect to semi-spherical surface 15 sufficiently low to eliminate undue heating or scuffing of the surfaces. The sliding of sleeve 33 with respect to shaft 22, due to the thrust resulting from the gearing, or spring as stated above, maintains contact between the rounded lower surface of the sleeve and the spherical surface of the housing base when the gyro casing and the housing 14 are tilted through an appreciable angle relative to each other.

It is evident that the distance from point G to the spherical surface of housing member 15 increases from the center of that member toward its periphery. Hence, the effective length of the gyro between point G and the spherical surface 15 must increase as the gyro axis swings away from its central position. The center of gravity of the mass supported in the lower gimbal ring 17 being preferably somewhat above the point G, any force impressed upon housing 14 tending to swing it in one direction about its center of suspension H will tend to swing the gyro in the opposite direction about its center of support G. In any event the sleeve 14 with its rounded end functions as the blunt peg of a spinning top, giving it the well-known characteristic of seeking to maintain a vertical spin axis. When gravity is the only force acting, the spin axis will assume and maintain a vertical position. When accelerated in any direction not vertical, that is in any direction having a horizontal component, inertia tends to cause oscillation of the entire mass about the point H. At the same time the inertia of the inner mass supported at G will give rise to a torque acting on the gyro about that point. This torque will result in a precession of the gyro at right angles to the acceleration, bringing peg 33 into action to restore the spin axis to a vertical position. Although the spin axis will be displaced with respect to the housing 14 as point G swings about point H, it will remain substantially vertical.

The making of blunt peg 33 as a part separate from shaft 22 and providing for relative longitudinal movement between these parts is not essential, as shaft 22 as a whole could be mounted to have the necessary slight longitudinal movement in its bearings. The blunt peg would then of course rotate at very high speed and wear between it and the housing base 15 would then of course be more rapid than in the design illustrated, but the weight of the gyro would insure sufficient bearing pressure against the semispherical base, and in other respects the device would function like that of the embodiment herein disclosed.

In the foregoing description I have necessarily gone somewhat into detail in order to explain fully the particular embodiment of the invention herein illustrated, but I desire it to be understood that such detail disclosures are not to be construed as amounting to limitations, except as they may be included in the appended claims.

Having thus described my invention, I claim:

1. In an artificial horizon, a universally suspended housing having a semi-spherical base, a gyro comprising a casing universally supported within said housing about a center below the center of suspension of said housing, a gyroscopic rotor journaled within said casing and means at the lower end of said rotor and rotated thereby presenting a rounded lower extremity with substantially a point thrust bearing on said spherical surface whereby the gyro partakes of the characteristics of a blunt peg top and opposes any force tending to move its axis out of the vertical.

2. In an artificial horizon, a universally suspended housing, a gyro comprising a casing universally supported within said housing, said housing having a semi-spherical base centered within the line joining said center of suspension and said center of support, a gyroscopic rotor journaled within said casing, and means at the lower end of said rotor and rotated thereby presenting a rounded lower extremity with substantially a point thrust bearing on said spherical surface, whereby the gyro partakes of the characteristics of a blunt peg top and opposes any force tending to move its axis out of the vertical.

3. In an artificial horizon, a universally suspended housing, a gyro comprising a casing universally supported within said housing, said housing having a semi-spherical base centered within the line joining said center of suspension and said center of support, a gyroscopic rotor journaled within said casing and means at the lower end of said rotor and rotated thereby presenting a rounded lower extremity with substantially a point thrust bearing on said spherical surface, the center of gravity of said casing and rotor being disposed above said center of support, whereby the gyro partakes of the characteristics of a blunt peg top and opposes any force tending to move its axis out of the vertical.

4. In an artificial horizon, a universally suspended housing, a gyro comprising a casing universally supported within said housing, said housing having a semi-spherical base centered within the line joining said center of suspension and said center of support, a gyroscopic rotor journaled within said casing, and means at the lower end of said rotor and rotated thereby presenting a rounded lower extremity with substantially a point thrust bearing on said spherical surface, the center of gravity of said casing with its rotor being disposed between said center of suspension and said center of support.

5. In an artificial horizon, a universally suspended housing having a semi-spherical base, a gyro comprising a casing universally supported within said housing about a center below the center of suspension of said housing, a gyroscopic rotor journaled within said casing, an axially movable blunt peg at the lower extremity of said rotor, and means operatively associated with said rotor for rotating said peg and causing it to exert thrust downwardly against said spherical surface.

6. In an artifical horizon, a universally suspended housing having a semi-spherical base, a gyro comprising a casing universally supported within said housing about a center below the center of suspension of said housing, a gyroscopic rotor having an upright shaft journaled within said casing, an axially movable blunt peg at the lower extremity of said shaft, and means for rotating said blunt peg and causing it to exert thrust downwardly against said spherical surface, said means comprising speed reduction gearing between said shaft and said blunt peg.

7. In an artificial horizon, a universally suspended housing having a semi-spherical base, a gyro comprising a casing universally supported within said housing about a center below the center of suspension of said housing, a gyroscopic rotor having an upright shaft journaled within said casing, an axially movable blunt peg at the lower extremity of said shaft, and spiral speed reduction gearing between said shaft and said blunt peg, said gearing being arranged to exert thrust through said blunt peg downwardly against said spherical surface.

8. In an artificial horizon, a universally suspended housing having a semi-spherical base, a gyro comprising a casing universally supported within said housing about a center below the center of suspension of said housing, a gyroscopic rotor having a shaft journaled within said casing, a blunt peg slidable upon the lower extremity of said shaft and bearing against said spherical surface, and means associated with said shaft for rotating said blunt peg and exerting downward thrust therethrough against said spherical surface.

EDSON J. NOBLE.

REFERENCES CITED

The following references are of record in the file of this patent:

UNITED STATES PATENTS

| Number | Name | Date |
|---|---|---|
| 1,825,345 | Fieux | Sept. 29, 1931 |
| 1,435,580 | Bonneau | Nov. 14, 1922 |

FOREIGN PATENTS

| Number | Country | Date |
|---|---|---|
| 837,057 | France | Oct. 12, 1937 |